United States Patent [19]
Prior

[11] 3,875,414
[45] Apr. 1, 1975

[54] METHODS SUITABLE FOR USE IN OR IN CONNECTION WITH THE PRODUCTION OF MICROELECTRONIC DEVICES

[75] Inventor: Arthur Cunningham Prior, Malvern, England

[73] Assignee: The Secretary of State for Defense in Her Britannic Majesty's Government of the United Kingdom of Great Britain and Northern Ireland, London, England

[22] Filed: Aug. 20, 1973

[21] Appl. No.: 389,551

[52] U.S. Cl. .................... 250/492, 250/398
[51] Int. Cl. .................... H01j 37/00
[58] Field of Search .................... 250/492 A, 398, 400

[56] References Cited

UNITED STATES PATENTS

| | | | |
|---|---|---|---|
| 3,118,050 | 1/1964 | Hetherington | 250/492 A |
| 3,519,788 | 7/1970 | Hatzakis | 250/492 A |
| 3,644,700 | 2/1972 | Kruppa et al. | 250/492 A |
| 3,648,048 | 3/1972 | Cahan et al. | 250/492 A |
| 3,679,497 | 7/1972 | Handy et al. | 250/492 A |
| 3,710,101 | 1/1973 | O'Keeffe et al. | 250/492 A |
| 3,736,425 | 5/1973 | Chernow | 250/492 A |
| 3,745,358 | 7/1973 | Firtz et al. | 250/492 A |

*Primary Examiner*—James W. Lawrence
*Assistant Examiner*—B.C. Anderson
*Attorney, Agent, or Firm*—Cushman, Darby & Cushman

[57] ABSTRACT

A fabrication method suitable for use in or in connection with the production of a microelectronic device, which method is of the kind in which an electron beam which is accurately deflectable over a limited field is applied to change the nature of a layer of resist material on a substrate whereby parts of the layer of resist material may be selectively removed to form a predetermined pattern for the purpose of processing the substrate, includes providing on the layer of resist material a plurality of alignment marks so located on the layer that when the layer is in a desired position for exposure by the electron beam there is always at least one alignment mark belonging to the plurality in the field of accurate deflection of the electron beam, aligning the electron beam by reference to the alignment marks and selectively exposing the layer to the electron beam. The method may be that of producing a device mask suitable for subsequent use in the production of a microelectronic device or that of producing a microelectronic device itself.

9 Claims, 11 Drawing Figures

METHODS SUITABLE FOR USE IN OR IN CONNECTION WITH THE PRODUCTION OF MICROELECTRONIC DEVICES

The present invention relates to microelectronic devices and methods of producing them.

BACKGROUND TO THE INVENTION

The microelectronics industry depends to a very great extent on the techniques of photolithography for producing in-contact stencil masks. These are required to resist the chemicals employed in etching the many complex patterns involved in device manufacture. Such photolithographic stencil masks are made by coating the surface to be protected with a thin layer of one of a number of special light sensitive materials known as "photoresists." The coated surface is then exposed to light through a photographic mask containing the desired pattern. The action of the light is to produce chemical changes in the material which have the effect of altering its solubility in certain solvents. The exposed pattern can thus be 'developed' by treating with a solvent which dissolves either the parts which have been exposed to light (positive photoresist) or those parts which have not been exposed (negative photoresist), thus forming the desired in-contact mask on the specimen.

Optical methods of photolithography as described above are ultimately limited in resolution by the wavelength used, and for this reason production by optical means of devices with dimensions less than one micron is unlikely ever to be practicable. Even for dimensions of two or three microns the accurate registration of patterns, over the whole area of each of the several masks required to make a device, becomes very difficult, and very precise and costly optical treatment is required. For a variety of advanced microelectronic devices, particularly those required to work at high frequency of switching speeds, these limitations of optical photolithography are serious.

It is therefore preferable in certain circumstances to use an electron beam, instead of electromagnetic radiation, to expose the resist material, which may be the same as the photoresists or may be certain non-light-sensitive materials which, for this purpose, are known as "electron resists." An electron beam can be deflected to scan over certain areas in order to draw the desired pattern on the surface. By this means patterns with dimensions well under one micron can be produced. However problems arise when using electron beam fabrication in alignment or registration of the electron beam.

It is an object of the invention to provide an accurate method of alignment or registration of the electron beam.

BRIEF SUMMARY OF THE INVENTION

According to the present invention there is provided a method suitable for use in or in connection with the production of a microelectronic device, which method is of the kind in which an electron beam which is accurately deflectable over a limited field is applied to change the nature of a layer of resist material on a substrate whereby parts of the layer of resist material may be selectively removed to form a predetermined pattern for the purpose of processing the substrate, the method including providing on the layer of resist material a plurality of alignment marks so located on the layer that when the layer is in a desired position for exposure by the electron beam there is always at least one alignment mark belonging to the plurality in the field of accurate deflection of the electron beam, aligning the electron beam by reference to the alignment marks and selectively exposing the layer to the electron beam.

The method may be that of producing a device mask suitable for subsequent use in the production of a microelectronic device or that of producing a microelectronic device itself.

It is intended that "substrate" should not be construed in any way restricting in relation to positional orientation.

A first embodiment of the invention will be described concerning the production using electron beam processing of a mask of a first kind, herein called a device mask, which can be used subsequently in the production of microelectronic devices by conventional optical photolithographic processes. Further embodiments of the invention will then be described concerning the production of microelectronic devices by electron beam processing using a mask of a second kind, herein called a device reference mark mask, to provide registration (alignment) of the electron beam. A mask of a third kind, herein called a master reference mark mask, can be used in the production by electron beam processing of the device mask in the first embodiment and in the production of the device reference mark mask in the other embodiments.

These embodiments of the invention which are by way of example only, will be described with reference to the accompanying drawings, in which:

DETAILED DESCRIPTION OF THE INVENTION

Figure 1:
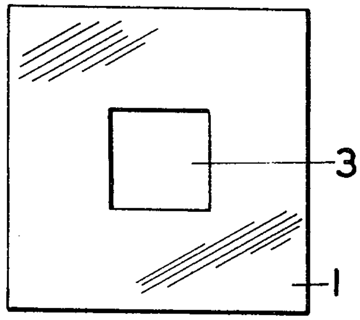
FIG. 1 is a plan view of a partially made device mask for use in the production of microelectronic devices using conventional optical photolithography.

In the production of microelectronic devices by standard optical photolithographic processes it is conventional to use a set of masks, the device masks, to define selective areas for processing (such as impurity diffusion or the production of the interconnection patterns) of each device. One of the first requirements that a set of device masks for a particular microelectronic device must fulfil is that they must be in correct register with one another. The absolute accuracy is usually of secondary importance, though convenient in the interests of interchangeability of different device masks. A set of device masks may be produced by a method embodying the invention, which method involves using electron beam processing. Let it be assumed for the sake of example that the device masks to be produced by this method will be used to cover a plurality of square semiconductor chips each having a size of 1.5 mm × 1.5 mm. The total area of each 1.5 mm × 1.5 mm square of each device mask to be produced may be divided into 15 × 15 smaller squares each to be scanned separately by the electron beam; the smaller squares will have dimensions of 100 μm × 100 μm. Provided that the relative positions of the 1.5 mm square are, to the degree of accuracy required, the same for all masks of a set, their absolute position is unimportant. However the relative position of the 100 μm squares within the larger 1.5 mm × 1.5 mm squares is important, if, as will generally be the case, the device mask pattern to be produced cannot be split up into sections each fitting into a 100 μm square. The relative position of each 100 μm square with its eight neighbours should be correct to about 0.1 μm or better so that parts of patterns crossing the boundaries will join up correctly, if a resolution in the order of 1 μm is required.

These conditions will be satisfied if the position of all the squares on each mask is determined by a set of reference marks on a single master reference mark mask made, for example, of chromium on glass. This master reference mark mask contains a plurality of 1.5 mm × 1.5 mm squares each containing a grid of 15 × 15 reference marks. Each reference mark consists of, for example, two separate rectangles 5 to 10 μm long and 2 μm wide aligned perpendicular to each other for determining the $x$ and $y$ co-ordinates.

Standard photolithographic techniques, starting with art work drawn on glass may be used to produce the master reference mark mask. Any step and repeat errors will be the same for all processes based on this original master reference mark mask. It is very doubtful whether the edges of the small (5μm × 2μm) rectangles will be defined and positioned with the desired accuracy of 0.1μm. However, it may be arranged that the centre line between the two edges has the desired accuracy of definition. The accuracy of this centre line position is also much less likely to be downgraded by subsequent copying stages than is that of either edge of each rectangle.

Alternatively, the master reference mark mask pattern may itself be produced by an electron beam. Scanning accuracy over a 1.5 mm square is inadequate for normal pattern generation. However, for the pattern of reference marks, where the criterion is that the position of each mark should be correct to some small tolerance, say 0.1 μm, with reference to the eight surrounding marks, the requirements are substantially less stringent. Also for the production of this one master reference mark mask special and slower than normal procedures to minimise errors might be economic.

One procedure for making a device mask based on the master reference mark mask is as follows. A block of transparent material, for example glass, coated with suitable opaque material such as chromium, which may be etched to form the desired device mask pattern, is covered with a layer of resist for subsequent exposure to the electron beam. On top of this a pattern of reference marks is made. The reference mark pattern is formed by conventional optical photoresist techniques with the master reference mark mask, using a suitable known combination of solvents and etching reagents so that the electron resist layer remains unaffected.

FIG. 1 is a plan view of a glass block 1 upon which is to be produced a patterned layer of chromium for use as a device mask in the production of a semiconductor microelectronic device by accurate but conventional optical techniques. The glass block 1 is typically 2 inches square. The block 1 carries on its surface a smaller region 3, typically of dimensions 1 inch square. The region 3 consists of a series of layers from which the required device mask pattern is to be produced. A cross-sectional diagram of the block 1 and the region 3 is shown in FIG. 3. The region 3 contains a layer 25 of chromium covered by a layer 27 of resist and a layer 29 of metal which is patterned in the form of reference marks. The detail of the pattern in the layer 29 of metal is omitted in FIG. 1 for clarity, but is identical with the pattern on a master reference mark mask which is illustrated on an enlarged scale in FIG. 2.

Figure 2:
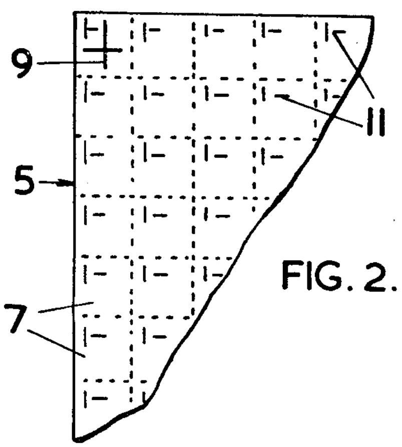
FIG. 2 is an enlarged plan view of part of a master reference mark mask used to make a device mask.
Figure 3:
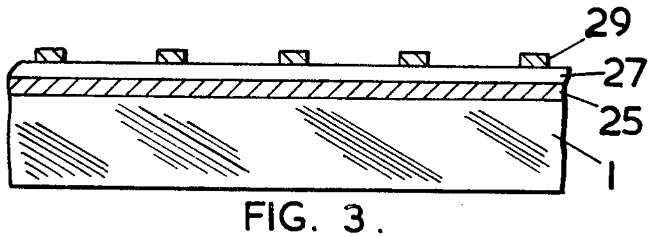
FIG. 3 is an enlarged cross-sectional diagram of part of a partially made device mask.

FIG. 2 is a plan view of the marks on a master reference mark mask, which may be a piece of glass on which is deposited rectangles of chromium in the form of reference marks by one of the processes outlined above. The master reference mark mask is divided into an imaginary grid of 15 mm × 15 squares 5, each of which is divided into an imaginary grid of 15 × 15 smaller squares 7 having dimensions 100 μm × 100μm. Part of one of the squares 5 is shown. Each of the squares 7 contains one or more reference marks. These reference marks are of two types, illustrated by a mark 9 on the one hand and marks 11 on the other. Every 100 μm square 7 carries a mark 11 but it is necessary for only one 100 μm square 7 in each 1.5 mm square 5 to carry a mark 9. The mark 9 is a cross shape mark having a size comparable with that of the squares 7. The marks 11 are smaller than the mark 9 and consist of two mutually perpendicular rectangles each typically between 5 and 10 μm long and 2 μm wide.

The master reference mark mask is used to provide the pattern of the layer 29 on the device mask in a conventional way, for example by means of the exposure of a suitable photoresist covering the layer 29, using the master reference mark mask, and subsequent development and etching to leave the marks in the form of deposited material. The marks in the layer 29 are therefore the same as those on the master reference mark mask illustrated in FIG. 2. The material of which the layer 29 is made may, for instance be aluminum or chromium or a metal of high atomic number, such as gold, which gives high secondary electron emission under the action of an electron beam. Furthermore it is desirable and feasible that the thickness of this metal layer be sufficiently small so that the electron beam (used for exposing the resist for pattern generation) is not significantly changed on passing through it, so that the exposure of the resist is little different under those areas covered by the metal as it is on those areas not so covered.

The thickness of the metal should however be sufficiently great that the secondary electron signal gives a good contrast between the covered and the uncovered areas.

Both of the above requirements may usually be satisfied adequately by a layer of gold about 50 nm thick.

It is a feature of this embodiment of the invention that, because the observation of and the presence of the reference marks does not affect the pattern to be drawn, the reference marks can be positioned arbitrarily with respect to the pattern being drawn.

Other arrangements of marks, having essentially the same function as the marks 9 and 11 may be used. The marks may be either regions of metal or alternatively apertures in an otherwise continuous film.

Once the reference marks are provided in the form of the layer 29, the region 3 is ready for processing.

The block 1 together with its accompanying layers is inserted into a scanning electron microscope. Using a very small current the electron beam obtained in this instrument can be focused to a diameter of less than 0.02 μm, but for exposing resist, beam diameters between 0.1 and 1.0 μm are normally used with much larger currents. The scanning coils of the scanning electron microscope are usually close to the specimen stage and the reason for the division of the region 3 into the squares 5 is to obviate undue deflection of the electron beam. Deflection of an electron beam over the whole of the region 3 would require the beam to be deflected through extremely large angles and would give rise to loss of definition. Deflection of the beam is limited to within each 1.5mm square 5. That is, mechanical specimen movement is required every 1.5mm. Further, the ratio of the distance through which the electron beam can be accurately deflected to the accuracy of alignment is normally about 1000:1. Therefore, if the desired relative accuracy of alignment is 0.1 μm then electronic realignment is required about every 100 μm, corresponding to changes between the squares 7. ( In other words, the field of accurate electronic deflection of the beam is in the order of 100 μm) A resist is best chosen which has such a sensitivity that it can be sufficiently rapidly exposed by the electron beam for the process to be economic, but which is not too sensitive to allow examination of the reference marks by the electron beam without itself being significantly affected. One suitable resist is polymethylmethacrylate.

Figure 4:
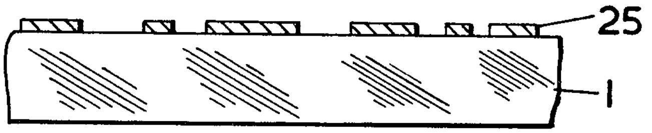
FIG. 4 is an enlarged cross-sectional diagram of part of a finished device mask.

The device mask is then fabricated as follows. The electron beam is aligned into the top left-hand square 7 of the appropriate one of the squares 5. The square 7 contains the reference mark 9. The beam is coarsely aligned with the specimen by use of the mark 9. The beam is then finely aligned, by use of the two rectangles comprising the reference mark 11 with an accuracy of about 0.1 μm. The beam is then used to scan the surface in selected areas and change the nature of the resist material within the square 7 to define the desired pattern of the mask to be fabricated. For this purpose the beam may be computer controlled. The beam is then realigned in one of the neighbouring squares 7 by use of the fine mark 11 contained therein, and the pattern exposure is repeated. In this way the appropriate areas of the square 5 are covered. Mechanical movement of the specimen to being the next square 5 into range is then provided followed by coarse alignment and then fine alignment and subsequent processing. In this way, the complete region 3 is covered, and the required pattern is generated by the electron beam. The metal layer 29 of reference marks may then be removed. The soluble regions of resist are dissolved away leaving a patterned layer of resist. By etching, the desired device mask pattern is reproduced in the layer 25 of chromium. After removal of the remainder of the resist layer 27 the final result is a device mask, as shown in FIG. 4, consisting of a glass block 1 bearing the layer 25 which is in the form of the desired patterns. The device mask is then ready for use in the production by conventional optical photolithographic techniques of a microelectronic device such as semiconductor integrated circuit.

The process described above for the production of a device mask may be used for the direct production of certain kinds of device, for instance the transducers of a surface acoustic wave device which include simply a patterned layer of material on an appropriate substrate (a material capable of supporting surface acoustic waves).

The actual alignment procedure used in the above method may be as follows. If the reference marks of the layer 29 contain gold or another element having a high atomic number than the secondary electron emission signal as the beam is scanned across a mark is in the form illustrated in FIG. 9*a*. The signal is shown as a function of the position $x$ of the beam as it scans across the mark. The fall in signal level shown corresponds to a gap between two islands of gold in the layer 19. A measure of the position of the centre line of the reference mark formed by the islands and the gap between them may be obtained by observing the values $x_1$ and $x_2$ at which the signal level changes abruptly and computing the centre line value $(x_1 + x_2)/2$. It is desirable that the total electron charge density per unit area impinging on the specimen during the registration process is sufficiently small that the electron resist is not significantly affected by it. In practice this condition will be adequately achieved if the electron charge density applied during registration is about one hundredth of the charge density normally used to expose resist material for subsequent development to generate a pattern.

If the charge density that is used is limited however this in turn imposes a limit on the signal to noise ratio that can be achieved, and it is therefore desirable that the method used for determining the position of the centre line of the reference mark should make efficient use of the information contained in a noisy signal. One method is as follows.

Figure 9A:
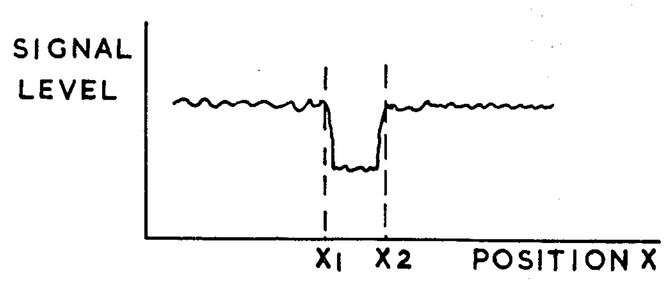
FIGS. 9*a* and 9*b* are graphs illustrating secondary electron emission signals obtained from the reference marks used in the method described with reference to FIGS. 3 and 4.
Figure 9B:
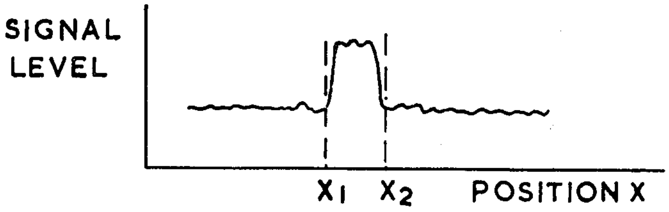

An $x$ coordinate alignment is first obtained by transversing the electron beam across a reference mark belonging to the layer 29 and aligned along a perpendicular or $y$ axis, and the signal obtained is as illustrated in FIG. 9*a*. This signal is then inverted in a known way and is then in the form shown in FIG. 9*b*. This inverted signal S may then be processed using the apparatus illustrated in FIG. 10 (which is a block diagram of signal processing apparatus). The signal S corresponding to each incremental value of $x$ is fed into a multiplier 51 and is multiplied with that value of $x$ to give the product $Sx$. The product $Sx$ for the whole reference mark is integrated in an integrator 53, giving an output $\int Sxdx$. /Also, the value of S alone for the whole reference mark is integrated by an integrator 55 to give an output $\int Sdx$. The output of the integrator 53 is divided by the output of the integrator 55 by means of a divider 57 giving a resultant $\int Sxdx / \int Sdx = \bar{x}$. The value of $\bar{x}$ may be sampled and/or held by a conventional unit 59. The value of $\bar{x}$ can also be compared with the ideal value of $\bar{x}$, namely $\bar{x}_0$, (corresponding to perfect alignment) by an error amplifier 61. The output of the error amplifier 61 can then be used to correct the deflection of the electron beam in the region near the reference mark in question.

While the beam is being scanned in the $x$ direction to evaluate $x$, it may simultaneously be scanned in the $y$ direction along the direction of the reference mark using very conveniently a saw tooth waveform. The $y$ direction scan must be much more rapid than the $x$ direction scan so that, say, 100 complete $y$ direction scans occur during one $x$ direction scan.

The object of such a y direction scan is twofold: (1) it will average out irregularities that may be present in the reference mark, and (2) it will spread the electron charge deposited on the specimen during the registration process over a larger area to reduce the exposure of the electron resist.

Figure 10:
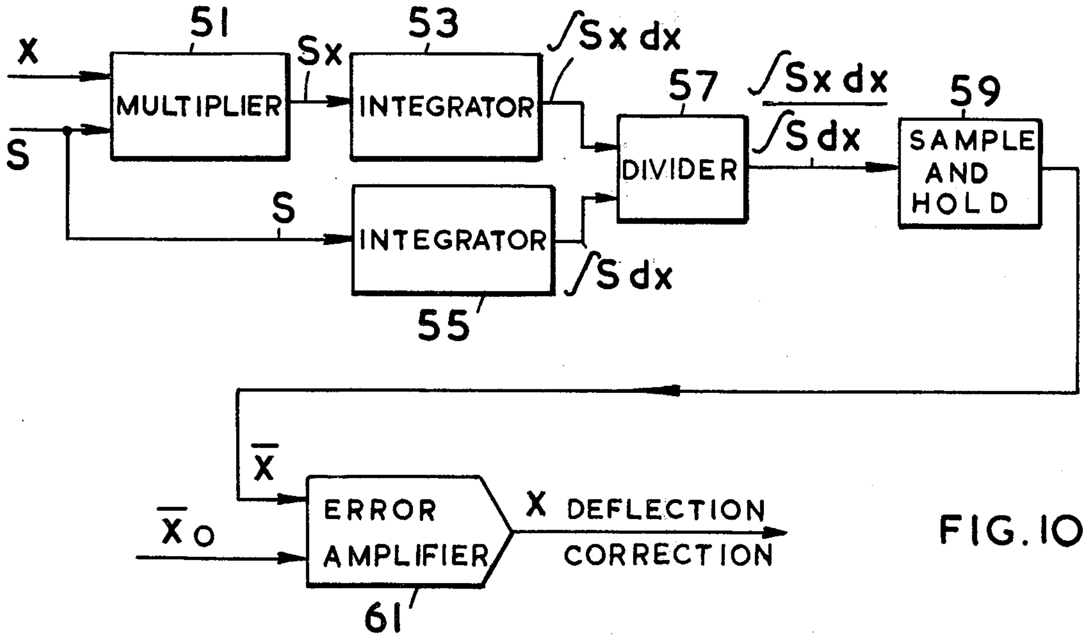
FIG. 10 is a block diagram of signal processing apparatus for processing the signal illustrated in FIG. 9*b*.

The advantage of the method for evaluating $\bar{x}$ described with reference to FIG. 10, as compared with the method involving the direct determination of $x_1$ and $x_2$ described with reference to FIG. 9*a*, is that the resultant value is less subject, as a result of the integration process, to errors resulting from the presence of noise during the fall and rise of the signal level around $x_1$ and $x_2$. This is particularly noticeable when using a large beam current, which results in the slopes of the changes in signal level around $x_1$ and $x_2$ not being very steep.

In order to eliminate the possibility of a shift in the position of the electron beam that could result from any attempt to alter the magnitude of the beam current, it is desirable to use the same beam current for the alignment process as for drawing the desired patterns subsequently. Thus in the interest of high speed of pattern drawing, a large current and hence a large diameter electron beam is normally used. As a result the edges at $x_1$ and $x_2$ in FIG. 9*a* will not normally be very steep.

If the electron beam current used is too large it may not be possible to perform the alignment process sufficiently fast, due to speed limitations in the electronic processing system, unless some measures are taken to reduce the effective beam current. If the risk of producing a possible shift in position of the beam by reducing its intensity is too great to be acceptable, or if the means for reducing the beam intensity is too slow, the desired effective reductions in beam intensity may be achieved by either (*a*) switching the beam on and off completely with suitable on/off time at a repetition frequency high compared with the scan frequency in either the $x$ or $y$ direction, or (*b*) using a saw tooth y direction scan (as mentioned above), switching the beam on for the scan in the forward direction and off for the scan in the return direction and adjusting the speeds of the scans in the forward and return directions appropriately.

By suitable sequencing controls alignment of the beam with respect to the $x$ coordinate may be followed by alignment with respect to the $y$ coordinate, to give completely automatic alignment procedure.

The accuracy of the alignment process is improved by reducing the length of the electron beam scan across the reference mark to as low a value as possible (but also consistent with the certainty of finding the mark within the scanned length) and also by using reference marks as narrow as possible (but consistent with their reliable production and the attainment of a full amplitude signal).

For direct electron beam processing of semiconductor slices using a scanning electron microscope, it is convenient to provide reference marks on the semiconductor slice. A minimum of two sets of marks in small areas set aside for the purpose, at opposite ends of a diameter of the slice, is possible. Each of these two special areas contains marks suitable for the purpose of applying, by contact photolithography, a full set of reference marks on the top surface of the resist, using a mask herein called a device reference mark mask. For greater accuracy the special areas also contain a fine set of marks which are compared, in the scanning electron microscope, for position relative to appropriate reference marks included in the pattern deposited on the top of the resist using a device reference mark mask. Thus the first operation in the scanning electron microscope is to measure the error in position of the reference mark pattern, as compared with the slice, at the two ends of a diameter. From this, the error in position of each of the reference marks in the pattern can be calulated so that corrections can be applied in turn at each 100$\mu$m lining point.

Figure 5:
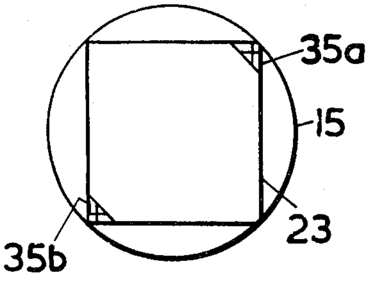
FIG. 5 is a plan view of a silicon slice which is to be made into an integrated circuit by exposure to an electron beam in a scanning electron microscope.

In FIG. 5 a plan view of a silicon slice 15 having a diameter of about 1 inch is shown. The prior art electron beam method of fabricating such a slice is by the use of a set of many reference marks deposited directly on the surface of the slice, but severe congestion results when a compact array of circuits is desired. Instead, for use in a method embodying the present invention, the slice 15 contains on its surface only a small number of reference marks similar to the number required in standard photolithography, while the full array of reference marks is applied on top of a layer 23 of resist material, which may be polymethylmethacrylate, used to cover the area of the slice 15 desired to be processed. The small number of reference marks are contained in an area 35*a* and an area 35*b* at opposite ends of a diameter of the slice 15, which ends are covered by the layer 23.

Figure 6:
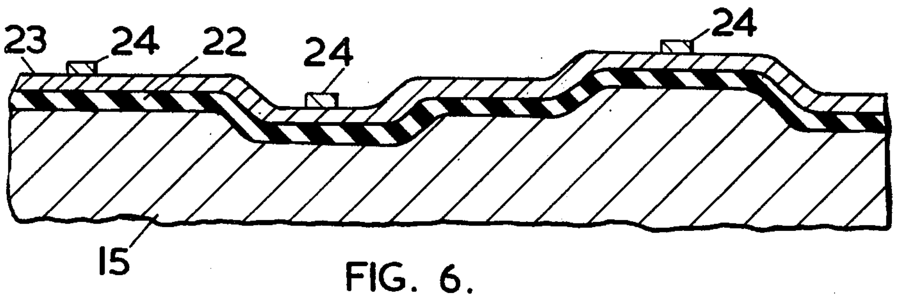
FIG. 6 is an enlarged cross-sectional diagram of part of the slice shown in FIG. 5.

FIG. 6 is an enlarged cross-sectional diagram of part of the device being produced and shows the silicon slice 15 carrying a silicon dioxide layer 22 which is conventionally used at a later stage as a mask to the silicon slice 15 for the selective processing thereof (such as by selective diffusion) and as an electrical insulator. The layer 22 carries in its turn the layer 23 of resist material. Reference marks 24 which may be made of gold or aluminum are deposited on the layer 23.

Figure 7:
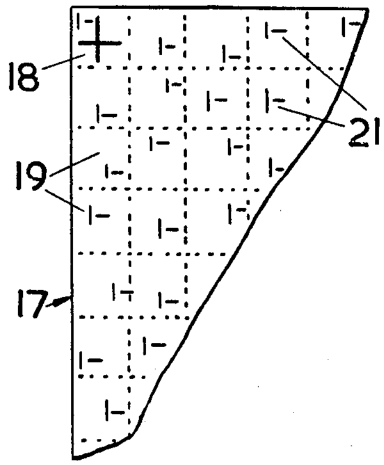
FIG. 7 is an enlarged plan view of part of a device reference mark mask used in conjunction with the slice shown in FIG. 5.

The marks are applied to the top surface of the resist layer 23 by contact photolithography with the use of a device reference mark mask. This mask may be one whose pattern of reference marks has been produced from the master reference mark mask by an electron beam process similar to that described above for the production of a device mask. The marks used are very similar to those described above on the master reference mark mask and are shown in FIG. 7. That is, a mark 18 is contained within one of a number of imaginary 100 $\mu$m squares 19, which squares 19 are divisions from each of a number of imaginary 1.5 mm squares 17, and smaller marks 21 are also contained in each imaginary square 19. The marks 21 are identical in appearance to the marks 11 described above with reference to FIG. 2. However, it is necessary that each of the marks 21 in its appropriate square 19 is in such a position that it will not coincide with any local discontinuities in the surface of the slice 15. (This is because the lining up accuracy would be affected by any such discontinuities). This explains the apparently random positions of the marks 21.

The silicon substrate will necessarily contain a small number of marks as fixed reference points for the full set of marks 18, 21. This small number of marks may take the form of features already contained in the slice 1, such as changes in surface contour, but for accurate work these marks used as fixed reference points are contained at opposite ends of a diameter of the slice 15 in the areas 35*a*, 35*b*.

Figure 8:
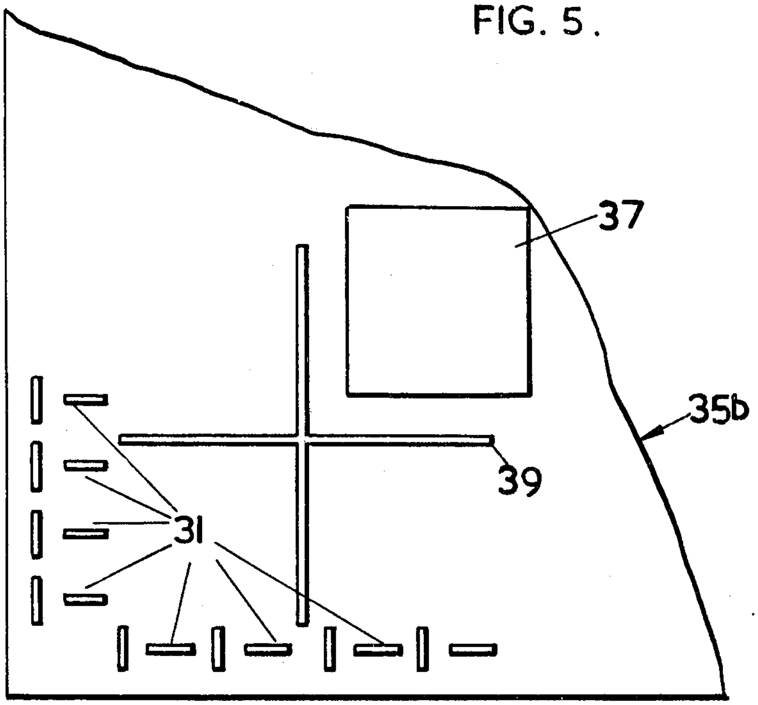
FIG. 8 is an enlarged plan view of part of the slice shown in FIG. 5.

FIG. 8 shows a possible arrangement of the marks used as fixed reference points in part of one of the areas 35*a*, 35*b* (the area 35*b* being illustrated). The marks consist of a 40 $\mu$m × 40 $\mu$m square mark 37 for use in optical alignment, an 80 $\mu$m ×80 $\mu$m mark 39, having areas some 2 $\mu$m wide, for coarse electron beam alignment and several (for averaging for increased accuracy) very small marks 31 similar to the marks 11 in FIG. 2 for fine inspection. The marks 37, 39, 31 may be obtained on the surface of the slice 15 by use of standard contact photolithography and electron beam processing. In such a process an optical mask is made and used to lay metal marks on top of a resist layer (which may be polymethylmethacrylate). The resist is exposed to an electron beam in the appropriate areas in a scanning electron microscope and the procedure of removing the metal, dissolving away the processed resist, etching and removal of the remainder of the resist results in the appropriate marks, which may take the form of etch depressions, being made on the surface of the slice 15. This set of marks serves the purpose both of helping to align the device reference mark mask with the slice 15 for applying by contact photolithography the full set of reference marks 18, 21 on top of the layer 23 of resist, and also of allowing errors in the position of this set of marks 18, 21 of reference marks to be determined in the scanning electron microscope and corrected for. The marks 39 and 31 made on the slice 15 need not be identical in size and/or shape with the corresponding marks on the device reference mark mask, but the detailed nature of the marks 31 and 39 on the slice 15 and the marks on the device reference mark mask can be so chosen as to facilitate measurement with the electron beam of the displacement between the marks on the slice 15 and the marks 24 made by use of the device reference mark mask.

The specimen consisting of the slice 15, the resist layer 23 and the applied metal marks 18, 21 is first examined in a scanning electron microscope (using the latter as a microscope rather than as a processing instrument) to find the error in position of the full set of reference marks 18, 21 relative to the small number of marks 29, 31 at spposite ends of a diameter of the slice 15. From this, the error in position of each of the reference marks 18 can be calculated and applied in turn at each 100 $\mu$m square 19. With the errors so calculated and the corrections applied, the electron beam is aligned with the specimen and is then deflected, in stages as described above for the production of the device mask, over the surface of the resist layer 23 in selected areas (according to a pre-determined programme) to define the desired patern. For this purpose the electron beam may be computer controlled. The procedure of removing the marks, dissolving away the soluble regions of resist, etching selectively through the dioxide layer 22 and removing the remainder of resist follows, leaving the slice 15 carrying the desired pattern of dioxide. Selective dopants may then be diffused through the layer 22 into the slice 15, to form, for example, sources and drains of MOS transistors.

It will be appreciated that in the fabrication of any device there will be several stages at each of which it is desired to etch a different pattern in the surface of the slice 15.

It may be found that the two areas 35*a*, 35*b* on the surface of the slice 15 are not enough, perhaps because of distortion in the slice 15. If this is so, then a large number of areas may be distributed over the slice 15. These areas would still only take up a small proportion of the surface area. Special measures (such as evaporation of a protective layer through a mask) may be taken to preserve these areas against any processes which might affect them.

I claim:

1. In method for producing microelectronic devices wherein an electron beam which is accurately deflectable over a limited field forms a predetermined pattern in a layer of organic resist material on a substrate and wherein portions of the layer of resist material are selectively removed to form a corresponding pattern for the purpose of processing the substrate, the method of registering the microelectronic device comprising the step of:

providing on the layer of resist material a plurality of alignment marks so located on the layer that when the layer is in a desired position for exposure by the electron beam there is at least one alignment mark among the plurality of alignment marks in the field of accurate deflection of the electron beam, aligning the electron beam by reference to each of said alignment marks by detecting the secondary electron emission image produced from the electron beam at at least one edge of an alignment mark, and selectively scanning the electron beam across the layer in the field of accurate deflection of the electron beam to draw the predetermined pattern, the position of the pattern having a predetermined fixed spatial relationship to said alignment mark.

2. The method of claim 1 further including the steps of aligning the electron beam by reference to each of the alignment marks by detecting the secondary electron emission image produced from the electron beam over a region of the mark embracing two edges of the mark, and processing the image by multiplying the image S produced at each position $x$ on the region of the mark by a signal representing the value $x$, integrating the product so formed to produce an integral $\int Sxdx$, integrating the image S itself to produce an integral $\int Sdx$, and dividing the integral $\int Sxdx$ by the integral $\int Sdx$ to provide a value $\bar{x}$ of the mean position between the two edges, the position of said pattern having a predetermined fixed spatial relationship to the mean position $\bar{x}$.

3. In a method of producing a device mask suitable for use in the production of a microelectronic device wherein the device mask includes a substrate having a body of solid transparent material carrying a layer of solid etchable, non-transparent material, wherein an electronic beam which is accurately deflectable over a limited field forms a predetermined pattern on a layer of organic resist material on said substrate and wherein portions of the layer of resist material are selectively removed to form a corresponding pattern for the purpose of processing the substrate, the improvement comprising the steps of:

providing on the layer of resist material a plurality of alignment marks so located on the layer that when the layer is in a desired position for exposure by the electron beam there is always at least one alignment mark of the plurality of alignment marks in the field of accurate deflection of the electron beam, aligning the electron beam by reference to each of the alignment marks by detecting the secondary electron emission produced from the electron beam at at least one edge of an alignment mark, selectively scanning the electron beam across the layer in the field of accurate deflection of the electron beam to draw the predetermined pattern, the position of the pattern having a predetermined fixed spatial relationship to the mark, and forming said corresponding pattern by selectively etching said solid etchable non-transparent material through said layer of resist material after said electron beam has been scanned across said layer of resist material.

4. The method of claim 3 wherein the layer of solid etchable material is made of chromium.

5. In a method of producing a surface acoustic wave device wherein the surface acoustic wave device includes a substrate having a body of material capable of supporting surface acoustic waves carrying a layer of etchable material suitable for surface acoustic wave transducers, wherein an electron beam which is accurately deflectable over a limited field forms a predetermined pattern in a layer of organic resist material on a substrate, and wherein portions of the layer of resist material are selectively removed to form a corresponding pattern for the purpose of processing the substrate, the improvement comprising the steps of:

providing on the layer of resist material a plurality of alignment marks so located on the layer that when the layer is in a desired position for exposure by the electron beam there is always at least one alignment mark of the plurality of alignment marks in the field of accurate deflection of the electron beam, aligning the electron beam by reference to each of the alignment mark by detecting the secondary electron emission image produced from the electron beam at at least one edge of the alignment mark, selectively scanning the electron beam across the layer in the field of accurate deflection of the electron beam to draw the predetermined pattern, the position of the pattern having a predetermined fixed spatial relationship to the mark, and forming said corresponding pattern by selectively etching said layer of etchable material through said layer of resist material after scanning said electron beam across said layer of resist material.

6. In the method for producing a semiconductor integrator circuit wherein the substrate includes a body of semiconductor material having a layer of electrical insulator material on which a layer of organic resist material is formed, wherein an electron beam which is accurately deflectable over a limited field forms a predetermined pattern on the layer of organic resist material on said substrate and wherein portions of the layer of resist material are selectively removed to form a corresponding pattern for the purpose of processing the substrate, the method of registering the semiconductor integrated circuit comprising the steps of:

providing on the layer of resist material a plurality of alignment marks so located on the layer that when the layer is in a desired position for exposure by the electron beam there is at least one alignment mark along the plurality of alignment marks in the field of accurate deflection of the electron beam, aligning the electron beam by reference to each of said alignment marks by detecting the secondary electron emission image produced from the electron beam at at least one edge of an alignment mark, selectively scanning the electron beam across the layer in the field of accurate deflection of the electron beam to draw the predetermined pattern, the position of the pattern having a predetermined fixed spatial relationship to said alignment mark, and forming said corresponding pattern by selectively etching said layer of electrical insulator material through said layer of organic resist material.

7. The method of claim 6 wherein said semiconductor material is silicon and said electrical insulator material is silicon dioxide.

8. The method of claim 6 further including the steps of providing a further plurality of alignment marks on the surface of the substrate carrying the layer of electrical insulator material, detecting the secondary electron emission image produced from the electron beam at the marks belonging to the further plurality of alignment marks, and correcting the position of the electron beam at each mark belonging to the first plurality by reference to the secondary electron emission image at the marks belonging to the said further plurality of alignment marks.

9. The method of claim 6 wherein the alignment marks are made from a layer of a noble metal.

* * * * *